US00RE48580E

(19) United States
(12) Reissued Patent
Andre et al.

(10) Patent Number: US RE48,580 E
(45) Date of Reissued Patent: Jun. 8, 2021

(54) COMPUTING DEVICE

(71) Applicant: Apple Inc., Cupertino, CA (US)

(72) Inventors: Bartley K. Andre, Palo Alto, CA (US); Daniel J. Coster, San Francisco, CA (US); Daniele De Iuliis, San Francisco, CA (US); Richard P. Howarth, San Francisco, CA (US); Jonathan P. Ive, San Francisco, CA (US); Steve P. Jobs, Palo Alto, CA (US); Duncan Robert Kerr, San Francisco, CA (US); Shin Nishibori, Kailua, HI (US); Matthew Dean Rohrbach, San Francisco, CA (US); Douglas B. Satzger, Menlo Park, CA (US); Calvin Q. Seid, Palo Alto, CA (US); Christopher J. Stringer, Woodside, CA (US); Eugene Antony Whang, San Francisco, CA (US); Rico Zörkendörfer, San Francisco, CA (US)

(73) Assignee: Apple Inc., Cupertino, CA (US)

(21) Appl. No.: 29/704,975

(22) Filed: Sep. 9, 2019

Related U.S. Patent Documents

Reissue of:
(64) Patent No.: Des. 741,316
Issued: Oct. 20, 2015
Appl. No.: 29/489,648
Filed: May 1, 2014

U.S. Applications:
(60) Division of application No. 29/622,909, filed on Oct. 20, 2017, now Pat. No. Re. 47,664, which is an application for the reissue of Pat. No. Des. 741,316, which is a continuation of application No. 29/412,855, filed on Feb. 8, 2012, now Pat. No. Des. 708,174, which is a continuation of application No. 29/400,286, filed on Aug. 25, 2011, now Pat. No. Des. 655,703, which is a continuation of application No. 29/391,635, filed on May 11, 2011, now Pat. No. Des. 645,860, which is a continuation of application No. 29/365,032, filed on Jul. 1, 2010, now Pat. No. Des. 639,295, which is a continuation of application No. 29/354,258, filed on Jan. 21, 2010, now Pat. No. Des. 621,409, which is a continuation of application No. 29/321,731, filed on Jul. 22, 2008, now Pat. No. Des. 612,844, which is a continuation of application No. 29/296,887, filed on Oct. 30, 2007, now Pat. No. Des. 574,378, which is a continuation of application No. 29/259,461, filed on May 8, 2006, now Pat. No. Des. 558,753.

(51) LOC (13) Cl. ..... 14-02
(52) U.S. Cl.
USPC ..... D14/315
(58) Field of Classification Search
USPC ..... D14/300–302, 315–316, 318, 320, 322, D14/328, 333–335, 345, 348, 392, 434, D14/455–457; D18/1, 2, 7, 11
CPC ..... G06F 1/16; G06F 1/1616; G09B 13/04; H01R 35/02; H03K 17/94; H03M 11/00
See application file for complete search history.

(56) References Cited

U.S. PATENT DOCUMENTS

| | | | | |
|---|---|---|---|---|
| D416,238 | S | 11/1999 | Irie et al. | |
| 6,067,224 | A | 5/2000 | Nobuchi | |
| 6,166,737 | A | 12/2000 | Lee et al. | |
| D463,797 | S | 10/2002 | Andre et al. | |
| 6,657,854 | B2 | 12/2003 | Horii et al. | |
| D491,177 | S | 6/2004 | Andre et al. | |
| D493,785 | S | 8/2004 | Andre et al. | |
| 6,771,494 | B2 * | 8/2004 | Shimano | 361/679.06 |
| D513,509 | S | 1/2006 | Kawa | |
| 7,035,665 | B2 | 4/2006 | Kido et al. | |
| D527,730 | S | 9/2006 | Dong | |
| D529,907 | S | 10/2006 | Dong | |
| D547,310 | S | 7/2007 | Yoon | |
| D556,192 | S | 11/2007 | Jeong | |
| D558,752 | S | 1/2008 | Andre et al. | |
| D558,753 | S | 1/2008 | Andre et al. | |
| D571,364 | S | 6/2008 | Andre et al. | |
| D572,247 | S | 7/2008 | Andre et al. | |
| D574,378 | S | 8/2008 | Andre et al. | |
| D589,507 | S | 3/2009 | Andre et al. | |
| D604,294 | S | 11/2009 | Andre et al. | |
| D611,045 | S * | 3/2010 | Andre | D14/327 |
| D611,469 | S | 3/2010 | Andre et al. | |
| D616,881 | S | 6/2010 | Andre et al. | |

(AMENDED)

| | | | | | |
|---|---|---|---|---|---|
| D617,789 | S | * | 6/2010 | Akana | D14/318 |
| D623,645 | S | * | 9/2010 | Andre | D14/315 |
| D625,717 | S | | 10/2010 | Andre et al. | |
| D633,087 | S | | 2/2011 | Andre et al. | |
| D635,566 | S | | 4/2011 | Andre et al. | |
| D639,295 | S | | 6/2011 | Andre et al. | |
| D661,296 | S | * | 6/2012 | Akana | D14/315 |
| D676,438 | S | * | 2/2013 | Akana | D14/318 |
| D682,821 | S | * | 5/2013 | Kim | D14/315 |
| D686,205 | S | * | 7/2013 | Akana | D14/318 |
| D708,176 | S | * | 7/2014 | Akana | D14/315 |
| D708,179 | S | | 7/2014 | Andre et al. | |
| D723,539 | S | | 3/2015 | Andre et al. | |
| D763,249 | S | * | 8/2016 | Lee | D14/315 |
| D766,233 | S | * | 9/2016 | Lam | D14/315 |
| D768,619 | S | * | 10/2016 | Akana | D14/315 |
| D774,505 | S | | 12/2016 | Akana et al. | |
| D776,107 | S | | 1/2017 | Akana et al. | |
| D776,653 | S | | 1/2017 | Akana et al. | |
| D787,500 | S | | 5/2017 | Akana et al. | |
| D803,825 | S | | 11/2017 | Akana et al. | |
| D806,700 | S | | 1/2018 | Akana et al. | |
| D806,701 | S | | 1/2018 | Akana et al. | |
| D812,604 | S | | 3/2018 | Akana et al. | |
| D813,224 | S | | 3/2018 | Akana et al. | |
| D813,225 | S | | 3/2018 | Akana et al. | |
| D813,226 | S | | 3/2018 | Akana et al. | |
| D816,661 | S | | 5/2018 | Akana et al. | |
| D819,017 | S | | 5/2018 | Akana et al. | |
| D820,826 | S | * | 6/2018 | Bowers | D14/315 |
| D820,829 | S | * | 6/2018 | Wang | D14/318 |
| D825,552 | S | * | 8/2018 | Andre | D14/315 |
| 10,228,721 | B2 | * | 3/2019 | Farahani | G06F 1/169 |
| D864,948 | S | * | 10/2019 | Yoshida | D14/327 |
| D888,048 | S | * | 6/2020 | Akana | D14/315 |
| 2005/0018396 | A1 | | 1/2005 | Nakajima et al. | |
| 2005/0041378 | A1 | | 2/2005 | Hamada et al. | |
| 2009/0040708 | A1 | * | 2/2009 | Tatsukami | G06F 1/1681 361/679.55 |
| 2010/0091442 | A1 | * | 4/2010 | Theobald | G06F 1/1679 361/679.09 |
| 2011/0182015 | A1 | * | 7/2011 | Chen | G06F 1/1616 361/679.09 |
| 2011/0255727 | A1 | * | 10/2011 | Azuchi | G06F 1/203 381/333 |
| 2012/0099264 | A1 | * | 4/2012 | Degner et al. | 361/679.09 |
| 2013/0327556 | A1 | * | 12/2013 | Casebolt | G06F 1/1681 174/82 |
| 2013/0329359 | A1 | * | 12/2013 | Andre et al. | 361/679.55 |

OTHER PUBLICATIONS

Apple PowerBook G4 Titanium, available at least as early as Jan. 1, 2001.
Apple PowerBook G4 Aluminum, available at least as early as Jan. 1, 2003.
Apple MacBook Pro, available at least as early as Jan. 10, 2006.
Apple MacBook Air, available Jan. 15, 2008, http://images.apple.com/macbookair/images/design_ga101_20080115.jpg.
Apple MacBook Air, available Jan. 15, 2008, http://images.apple.com/macbookair/images/design_ga102_20080115.jpg.
Apple MacBook Air, available Jan. 15, 2008, http://images.apple.com/macbookair/images/design_ga103_20080115.jpg.
Apple MacBook Air, available Jan. 15, 2008, http://images.apple.com/macbookair/images/design_ga104_20080115.jpg.
Apple MacBook Air, available Jan. 15, 2008, http://images.apple.com/macbookair/images/design_thinair20080115.
Apple MacBook Air, available Jan. 15, 2008, http://images.apple.com/macbookair/images/design_displayair20080115.jpg.
Apple MacBook Air, available Jan. 15, 2008, http://images.apple.com/macbookair/images/design_keyboardair20080115.jpg.
Apple MacBook Air, available Jan. 15, 2008, http://images.apple.com/macbookair/images/design_ga108_20080115.jpg.
U.S. Appl. No. 29/459,366 of Bartley K. Andre et al. filed Jun. 28, 2013.
U.S. Appl. No. 29/459,559 of Bartley K. Andre et al. filed Jul. 1, 2013.

* cited by examiner

*Primary Examiner* — Darlington Ly
(74) *Attorney, Agent, or Firm* — Saidman DesignLaw Group, LLC

(57) CLAIM

The ornamental design for a computing device, as shown and described.

DESCRIPTION

This application *is for a reissue of U.S. Pat. No. D. 741,316, which issued from application Ser. No. 29/489,648, filed May 1, 2014 and is also for a divisional reissue of prior pending application Ser. No. 29/622,909, filed Oct. 20, 2017, which is a reissue of U.S. Pat. No. D. 741,316, which issued from application Ser. No. 29/489,648, filed May 1, 2014, which* is a continuation of prior pending application Ser. No. 29/412,855, filed Feb. 8, 2012, which is a continuation of application Ser. No. 29/400,286, filed Aug. 25, 2011, now U.S. Pat. No. D. 655,703, which is a continuation of application Ser. No. 29/391,635, filed May 11, 2011, now U.S. Pat. No. D. 645,860, which is a continuation of application Ser. No. 29/365,032, filed Jul. 1, 2010, now U.S. Pat. No. D. 639,295, which is a continuation of application Ser. No. 29/354,258, filed Jan. 21, 2010, now U.S. Pat. No. D. 621,409, which is a continuation of application Ser. No. 29/321,731, filed Jul. 22, 2008, now U.S. Pat. No. D. 612,844, which is a continuation of application Ser. No. 29/296,887, filed Oct. 30, 2007, now U.S. Pat. No. D. 574,378, which is a continuation of application Ser. No. 29/259,461, filed May 8, 2006, now U.S. Pat. No. D. 558,753, the entirety of which are expressly incorporated herein by reference.

FIG. 1 is a perspective view of a computing device showing our new design;
FIG. 2 is a top *plan* view thereof; and[,]
FIG. 3 is a [front] *side elevation* view [thereof, showing the computing device in a closed position.] *thereof;*
*FIG. 4 is a front elevation view thereof; and,*
*FIG. 5 is a rear elevation view thereof.*
The broken lines illustrate [environmental structure] *portions of the computing device* which forms no part of the claimed design.

1 Claim, 5 Drawing Sheets

Matter enclosed in heavy brackets [ ] appears in the original patent but forms no part of this reissue; matter printed in italics indicates the additions made by reissue.

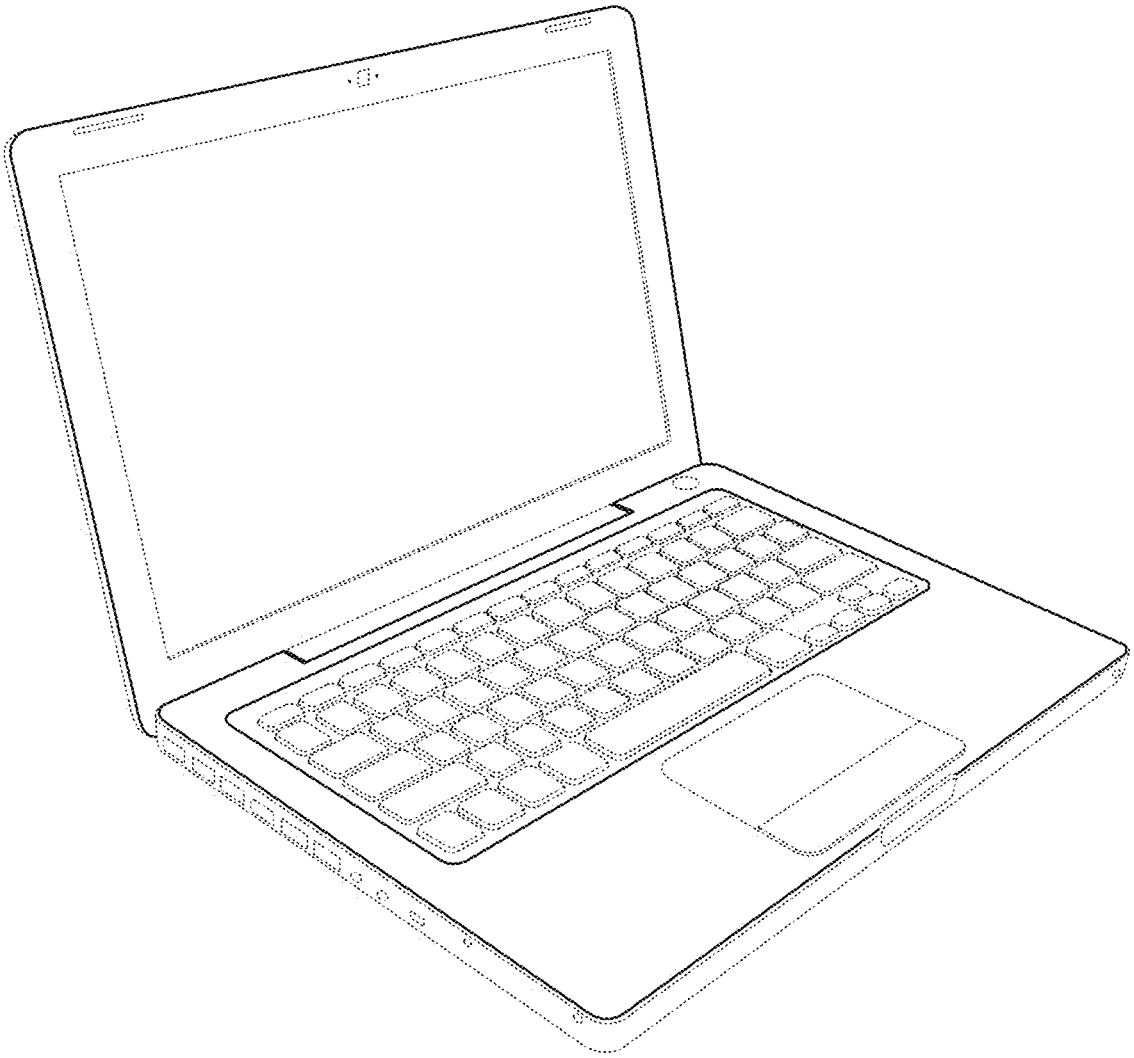
*Fig. 1*
(AMENDED)

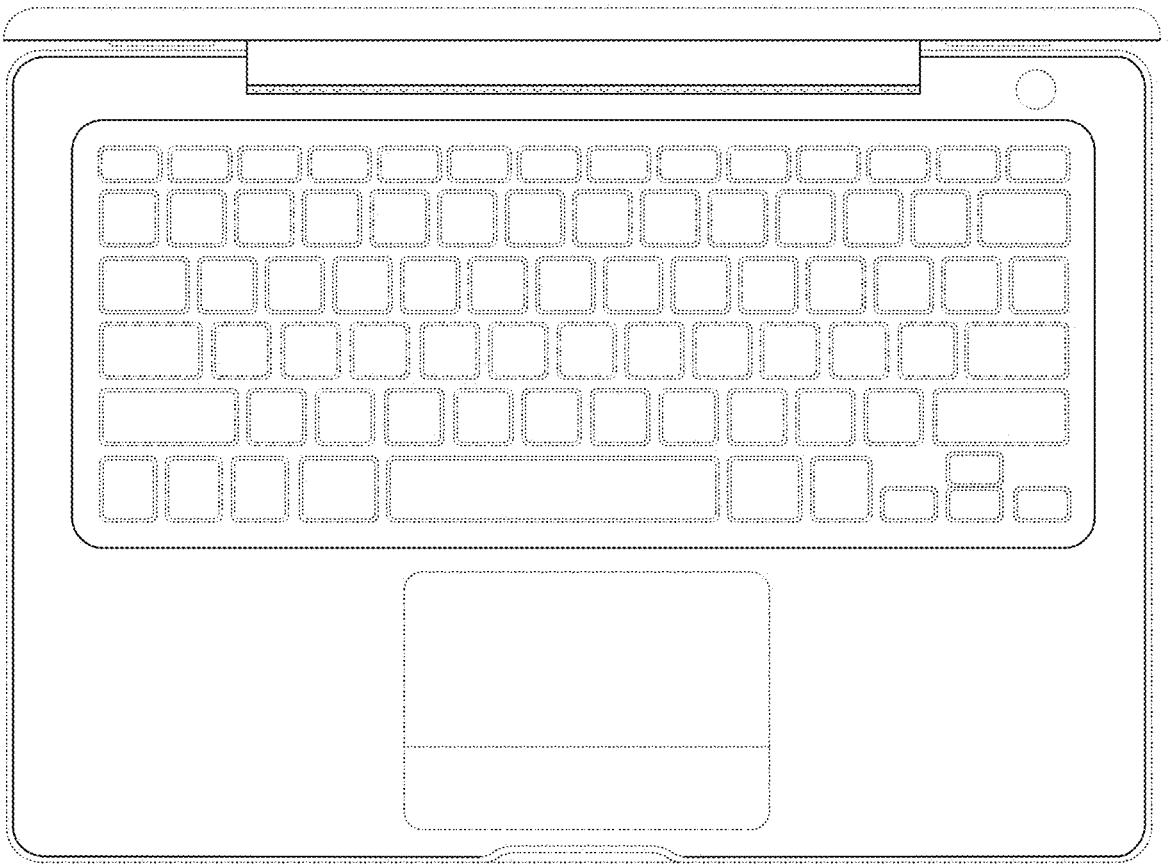
*Fig. 2*
(AMENDED)

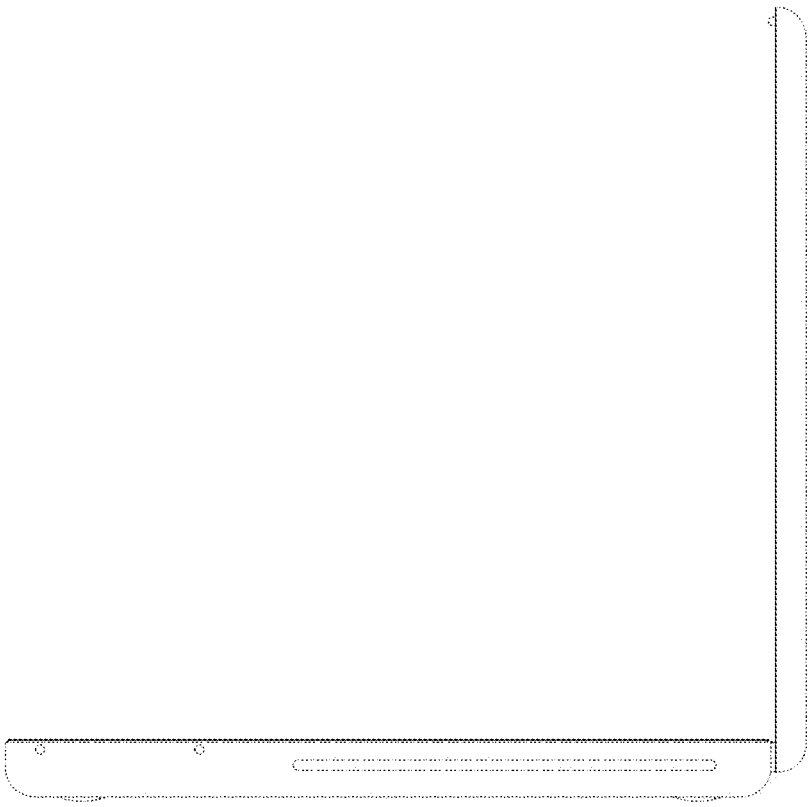
*Fig. 3*
(AMENDED)

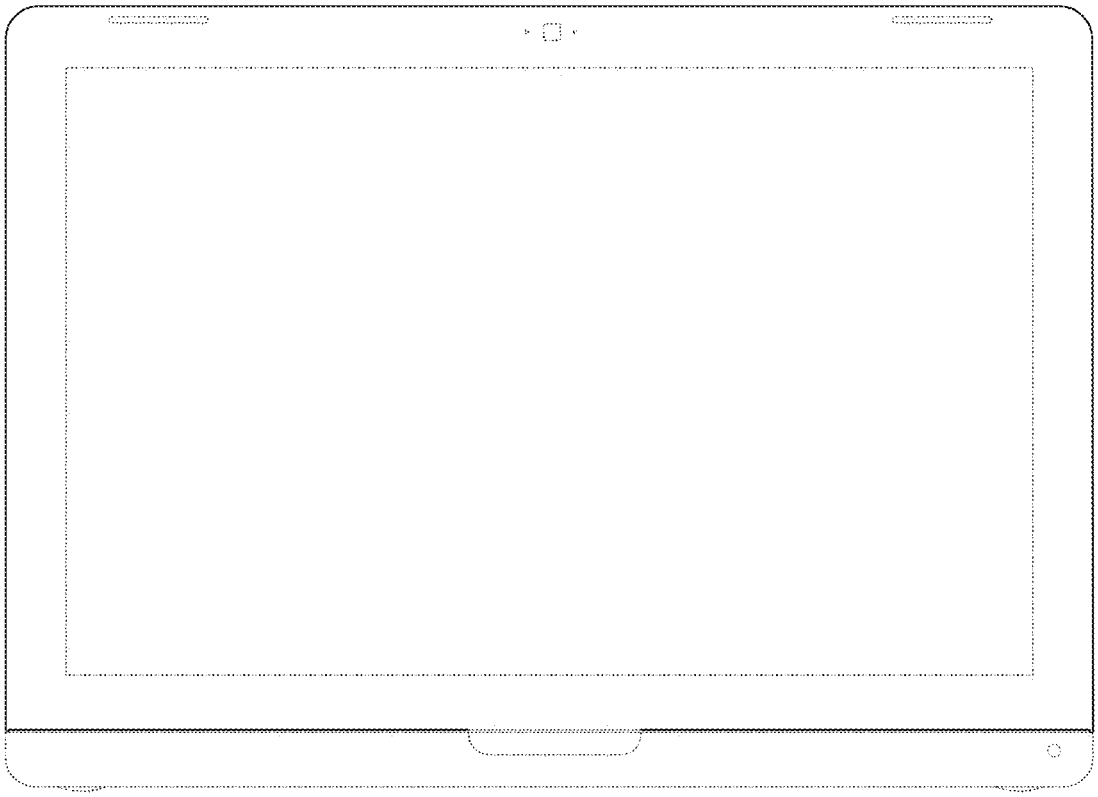
*Fig. 4*
(NEW)

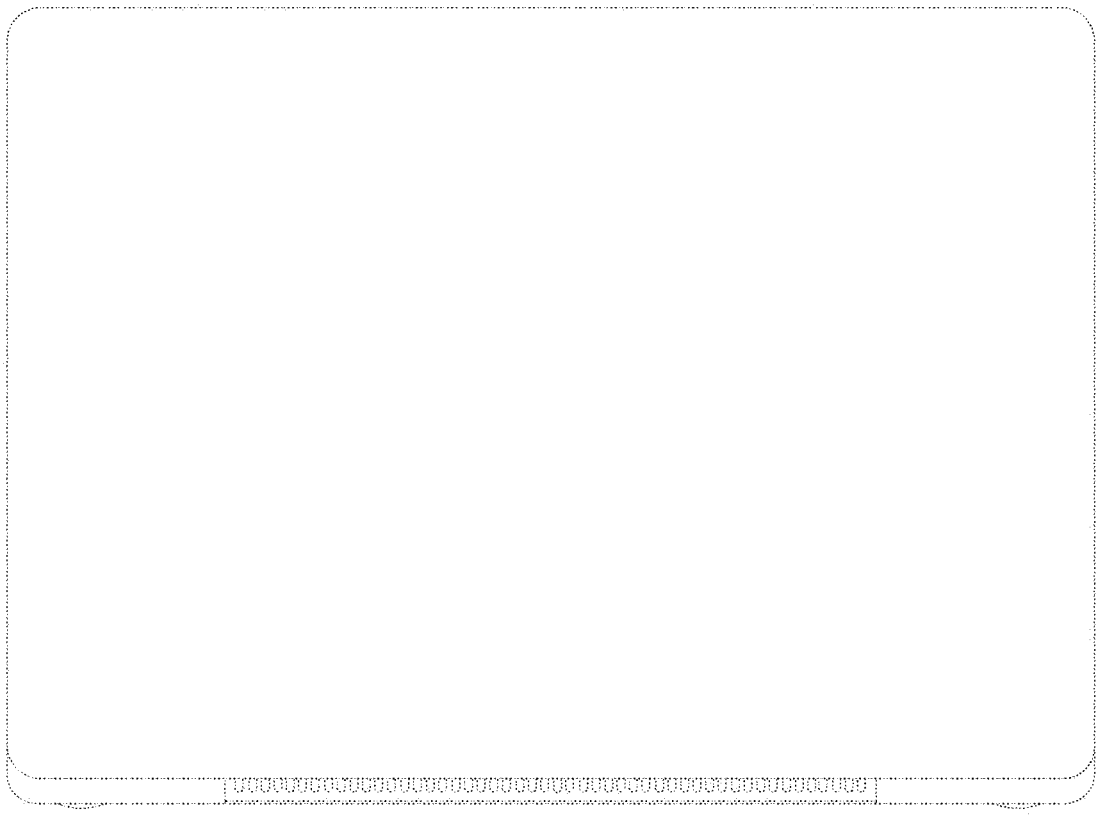
*Fig. 5*
(NEW)